United States Patent
Weidner et al.

(10) Patent No.: US 8,598,377 B2
(45) Date of Patent: Dec. 3, 2013

(54) METHOD FOR PRODUCING FATTY ACID ESTERS OF MONOVALENT OR POLYVALENT ALCOHOLS USING SPECIAL HYDROXY-FUNCTIONAL QUATERNARY AMMONIUM COMPOUNDS AS CATALYSTS

(75) Inventors: Eckhard Weidner, Bochum (DE); Axel Kraft, Oer-Erkenschwick (DE); Anna Grevé, Bochum (DE); Reinhard Broucek, Aschaffenburg (DE)

(73) Assignees: Fraunhofer-Gesellschaft zur Foerderung der angewandten Forschung e.V., Munich (DE); Balchem Corporation, New Hampton, NY (US)

( * ) Notice: Subject to any disclaimer, the term of this patent is extended or adjusted under 35 U.S.C. 154(b) by 188 days.

(21) Appl. No.: 13/125,387

(22) PCT Filed: Oct. 21, 2009

(86) PCT No.: PCT/EP2009/007544
§ 371 (c)(1),
(2), (4) Date: Jul. 21, 2011

(87) PCT Pub. No.: WO2010/046100
PCT Pub. Date: Apr. 29, 2010

(65) Prior Publication Data
US 2011/0300281 A1     Dec. 8, 2011

(30) Foreign Application Priority Data
Oct. 22, 2008  (DE) .................. 10 2008 052 795

(51) Int. Cl.
*C11C 3/02*       (2006.01)
*A23D 7/01*       (2006.01)
*A23D 9/013*      (2006.01)

(52) U.S. Cl.
USPC ............ 554/161; 426/601; 426/608; 568/852

(58) Field of Classification Search
USPC ............ 554/124, 161; 568/852; 426/601, 608
See application file for complete search history.

(56) References Cited

FOREIGN PATENT DOCUMENTS

| | | | |
|---|---|---|---|
| DE | 10245806 | A1 | 4/2004 |
| DE | 102004004660 | A1 | 9/2005 |
| DE | 102006028560 | A1 | 12/2007 |
| DE | 60035109 | T2 | 2/2008 |
| GB | 1313923 | * | 4/1973 |
| WO | 0112581 | A1 | 2/2001 |
| WO | 2004031119 | A1 | 4/2004 |
| WO | 2005100306 | A1 | 10/2005 |
| WO | 2006029655 | A1 | 3/2006 |
| WO | WO2007111604 | * | 10/2007 |
| WO | 2007143803 | A1 | 12/2007 |

OTHER PUBLICATIONS

Abbott et al , Extraction of glycerol from biodiesel into a eutetic based ionic liquid, 2007, Green Chem., vol. 9. p. 868-872.*
Stecher et al, The Merck Index, an Encyclopedia of chemicals and drugs, $8^{th}$ ed., Merck & Co. , Inc., 1968, p. 972.*
International Search Report for Appln. No. PCT/EP2009/007544 mailed Feb. 16, 2010.
Schuchardt et al., J. Bras. Chem. Soc., 9(3): 199-210 (1998).
Freedman et al., 3. Am. Oil. Chem. Soc., 63(19): 1375-1380 (1986).
Chiu et al., AIChE Journal, 51(4): 1274-1278 (2005).
Vicente et al., Ind. Eng. Chem. Res., 44: 5447-5454 (2005).
Schuchardt et al., J. Mol., Catal., 109: 37-44 (1996).
Sercheli et al., J. Am. Oil. Chem. Soc., 78: 1207-1210 (1999).
Cerce et al., Ind. Eng. Chem. Res., 44(25): 9535-9541 (2005).
Peter et al., Eur. J. Lipid Sci. Technol., 104: 324-330 (2002).
Peter et al., E., Eur. J. Lipid Sci. Technol., 109: 11-16 (2007).
Kim et al., Catalysis Today, 93-95: 315-320 (2004).
CAS Registry No. 934234-70-5, May 2009.
Liu et al., Journal of Catalysis 246(2): 428-433 (2007).

* cited by examiner

*Primary Examiner* — Taylor Victor Oh
(74) *Attorney, Agent, or Firm* — Carter, DeLuca, Farrell & Schmidt, LLP

(57) ABSTRACT

The present invention relates to a method for producing fatty acid esters from fats and/or oils of biogenic origin by transesterification with monovalent or polyvalent alcohols in the presence of a special hydroxy-functional quaternary ammonium compound as the catalyst.

12 Claims, No Drawings

METHOD FOR PRODUCING FATTY ACID ESTERS OF MONOVALENT OR POLYVALENT ALCOHOLS USING SPECIAL HYDROXY-FUNCTIONAL QUATERNARY AMMONIUM COMPOUNDS AS CATALYSTS

The present invention relates to a method for producing fatty acid esters from fats and/or oils of biogenic origin by transesterification with monovalent or polyvalent alcohols in the presence of a special hydroxy-functional quaternary ammonium compound as the catalyst.

Fatty acid esters are commercially produced by transesterification of oils and/or fats of biological origin, which predominantly consist of triglycerides, with an alcohol. The triglycerides react with alcohol in the presence of a catalyst thereby forming fatty acid esters and glycerol:

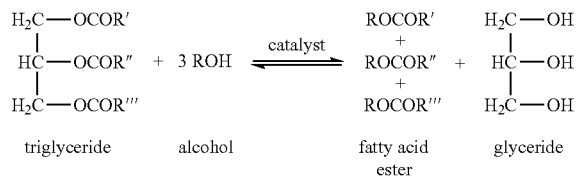

Since the original ester, i.e. the triglyceride, is reacted with an alcohol in this reaction, this transesterification reaction is also referred to as an alcoholysis. The alcoholysis of fat and/or oil of biogenic origin is highly significant for the economy and has become much more important in connection with the production of biodiesel (fatty acid methyl ester) by transesterification of vegetable oil, in particular rapeseed oil, with methanol in the past few years.

The transesterification or alcoholysis is an equilibrium reaction which as a rule already proceeds when the starting products are mixed at a suitable temperature. However, the reaction proceeds rather slowly so that commercial methods use catalysts to accelerate the reaction. In the majority of cases, base-catalyzed methods are employed since they proceed much faster than the acid-catalyzed methods using sulfonic or sulfuric acid, which are also known in the art (as to a review see e.g. Schuchardt et al., J. Bras. Chem. Soc. 9(3): 199-210 (1996)). The catalysts used in base-catalyzed transesterifications, in particular in the production of fatty acid methyl esters used as a biodiesel, are usually potassium hydroxide or sodium hydroxide or the corresponding methylates. It is thus possible to achieve conversion rates of >98%. However, both catalysts leave their cationic constituent in the reaction system and in particular in the glycerol which precipitates as a separate phase when the reaction mixture is allowed to stand. As a result, costly and time-consuming separation by neutralization and washing with water becomes necessary.

In addition, a certain amount of water is formed in the alkaline transesterification methods using sodium hydroxide or potassium hydroxide due to the reaction of hydroxide with the alcohol employed. The presence of water results in a saponification, i.e. the hydrolysis of the fatty acid esters formed and the formation of alkali salts of the released fatty acids (what is called soaps). The fatty acid ester yield is thus reduced as a result of the catalyst consumption. In addition, the soaps formed which have an emulsifying effect complicate the separation of the produced glycerol from the fatty acid esters formed. Therefore, the educts (fats and/or oils and alcohols) used have to be as water-free as possible and the starting fats and/or oils should also have a small amount of free fatty acids since the above described saponification is more intense in the presence of free fatty acids and increases the viscosity of the reaction mixture (see Freedman et al., J. Am. Oil Chem. Soc. 63(10): 1375-1380 (1986)).

The saponification may be reduced by the use of sodium or potassium methylate instead of sodium hydroxide or potassium hydroxide. However, the production of the methylates is considerably more expensive. For optimum conversion rates the latter also require the, if possible, complete absence of water from the reaction system.

Moreover, the efficiency of the base-catalyzed transesterification of fats and/or oils of biogenic origin with alcohols is also significantly determined by the type of alcohol. For example, even though it is basically possible to also use ethanol as a monovalent alcohol when potassium hydroxide or sodium hydroxide is employed as the catalyst, this transesterification reaction proceeds at a markedly slower rate compared to the reaction with methanol.

Another factor which significantly influences the base-catalyzed transesterification, in particular the yield, is the alcohol/triglyceride ratio. In general, the alcohol to be exchanged is added in excess to obtain a high yield of desired fatty acid esters. Depending on the employed fats and/or oils and catalyst, the optimum molar ratio usually varies from 6:1 to 45:1 (in the case of a high concentration of free fatty acids).

Along with the type of catalyst, the purity of the reactants (in particular the water content), the quality of the initial oil and/or fat (in particular the content of free fatty acids) and the alcohol (type of alcohol and water content) as well as the alcohol/triglyceride ratio, the effectiveness of the conventional base-catalyzed transesterification strongly depends on the phase behavior during the reaction. At the beginning of the reaction, the triglycerides and the alcohol form a two-phase reaction mixture. The contact of the reactants is initially confined by the mixing and the reaction is thus limited by the substance transport resistances at the phase boundary of alcohol and triglyceride. When the reaction time proceeds, partial glycerides and fatty acid esters are formed which improve the solubility of the alcohol. In particular in the case of the esterification with monovalent alcohols, an amount of glycerol may finally be formed such that its solubility limit is achieved and a separate glycerol phase precipitates. As a result, the conversion of the triglycerides slows down in the conventional catalysis since the catalyst is drawn into the glycerol phase to a disproportionate extent. However, the reactants are predominantly in the triglyceride phase so that the reaction is now limited by the substance transport and the unfavorable distribution of the catalyst (Chiu et al., AIChE Journal 51(4): 1274-1278 (2005); Vicente et al., Ind. Eng. Chem. Res. 44: 5447-5454 (2005)).

In the light of the above-mentioned problems which occur in the transesterification with conventionally used catalysts (NaOH, KOH; Na-methylate, K-methylate), a plurality of organic bases have been studied with respect to their suitability as catalysts in the base-catalyzed transesterification in the past few years. Scientific literature has described various amine, amidine, (alkyl)guanidine and triamino(imino)phosphorane compounds which may be used as catalysts in the transesterification of fats and/or oils (Schuchardt et al., J. Mol. Catal. 99: 65-70 (1995); Schuchardt et al., J. Mol. Catal. 190: 37-44 (1996); Schuchardt et al., J. Bras. Chem. Soc. 9: 199-210 (1998); Sercheli et al., J. Am. Oil Chem. Soc. 76: 1207-1210 (1999); Cerce et al., Ind. Eng. Chem. Res. 44(25): 9535-9541 (2005); Peter et al., Eur. J. Lipid Sci. Technol. 104: 324-330 (2002); Peter, S. & Weidner, E., Eur. J. Lipid Sci. Technol. 109: 11-16 (2007)).

In addition, the use of compounds having an imino group, tertiary amines, wherein the tertiary amines have at least one OH group or NH2 group and are no amino acids or derivatives thereof, and butylamine as catalysts in the production of fatty acid esters of monovalent alcohols by means of alcoholysis of fat and/or oil of biological origin is known from DE 102 45 806 A1 and WO 2004/031119 A1. DE 10 2004 044 660 A1 and WO 2006/029655 A1 also disclose the use of carbonic acid salts of guanidine or derivatives thereof, such as 1-aminoguanidine, as basic catalysts in the transesterification of fats and/or oils of biological origin by means of alcoholysis. In addition, it is known from WO 2005/100306 A1 to use another guanidine derivative, namely the N,N',N''-tris-(3-dimethylaminopropyl)-guanidine, in the transesterification of sunflower, soy bean and rapeseed oil. Finally, WO 2007/143803 A1 describes a method for the reaction of fats and/or oils using a catalyst selected from salts of hydroxide (OH—) and alkoxides (alcoholates), such as methanolate ($CH_3$—O—) or ethanolate ($CH3$—$CH2$—O—), with guanidine and N-alkylated derivatives thereof or with quaternary ammonium compounds.

The catalysts described in the above mentioned scientific publications and the patent literature as mentioned show a good catalytic activity in the transesterification of triglycerides. However, they do not function as a solubilizer with the conventionally used catalyst amounts and therefore cannot overcome the above explained problems associated with the phase behavior of the reaction mixture during the transesterification.

In order to improve the phase behavior, literature has thus proposed the use of a co-solvent. For example, Kim et al. describe a method where an additional component is used as a co-solvent, e.g. n-hexane or tetrahydrofuran, to minimize the substance transport resistances. These substances improve the solubility of the alcohol in fat and oil (Kim et al., Catalysis Today 93-95: 315-320 (2004)). Moreover, WO 01/12581 A1 describes a two-stage method for the production of fatty acid methyl esters, where in the second step triglycerides are transesterified using KOH or NaOH as basic catalysts in the presence of a co-solvent selected from the group consisting of tetrahydrofuran, 1,4-dioxane, diethyl ether, methyl-tert-butyl ether and diisopropyl ether.

However, the use of a co-solvent as a solubilizer has the drawback that another component is introduced into the reaction system, which has to be separated in complicated fashion at a later date.

Therefore, an object of the present invention is to provide a method which eliminates or minimizes the above mentioned problems in the production of fatty acid esters by converting to fat and/or oil of biogenic origin with alcohols in the presence of a catalyst.

This object is achieved according to the invention by a method in which fat and/or oil of biogenic origin is reacted with monovalent and/or polyvalent alcohols in the presence of a catalyst, wherein the catalyst is a hydroxy-functional quaternary ammonium compound of the following general formula (I):

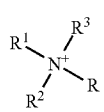 (I)

in which R1, R2 and R3 are equal or different and each represents an unsubstituted or substituted straight-chain or branched alkyl residue having 1 to 8 carbon atoms, preferably 1 to 1, 6 or 8 and R is a straight-chain or branched hydroxyalkyl, hydroxyalkenyl or hydroxyalkynyl residue having 1 to 12, preferably 1 to 8, more preferably 2 to 8 and most preferably 2 to 6 or 2 to 4 carbon atoms. The substituents may be straight-chain or branched alkyl, alkenyl, alkynyl, alkoxy, alkoxyalkyl, alkenyloxy and alkenyloxyalkyl groups having 1 to 5, preferably 1 to 3, carbon atoms.

It has been found surprisingly that compounds of the above shown general formula (I) are active as catalysts in the transesterification of fats and/or oils of biogenic origin with monovalent or polyvalent alcohols. On the one hand, these compounds are distinguished by a quaternary ammonium group and, on the other hand, by a saturation of a valence at the nitrogen atom of the quaternary ammonium group by a rather short straight-chain or branched hydroxyalkyl, hydroxyalkenyl or hydroxyalkynyl residue. Using these catalysts, it is possible to obtain in an extremely efficient way a fatty acid ester content which complies with the European standard for biodiesel (DIN EN 14214) in a single process step.

In the light of the structure of the catalytically active compounds according to general formula (I), a skilled person could not expect these compounds to show surface-active properties which considerably improve the mutual miscibility of alcohol and fat and/or oil. Surprisingly, only small amounts of the compound of general formula (I) are necessary to significantly improve the solubility of the alcohol in the triglycerides. In the presence of the compound of general formula (I), the alcohol and the triglycerides form a macroscopically homogeneous, optically transparent and thermodynamically stable mixture. It is presumably a microemulsion. The space-time-yield of the reaction is considerably accelerated by the formation of such a microemulsion.

It has also been found surprisingly that catalytically active compounds according to general formula (I) result in a rapid and complete segregation of the glycerol phase from the biodiesel phase (fatty acid ester phase) after the conclusion of the reaction and therefore it is possible to markedly reduce the separation and washing costs. Since the catalyst predominantly accumulates in the glycerol phase, it is thus also possible to separate the catalyst substantially quantitatively with the glycerol phase. As a rule, less than 1%, usually is less than 0.1%, of the catalyst, e.g. choline, is left in the biodiesel phase and more than 99% or more than 99.9% is left in the glycerol phase.

It has also been found surprisingly that it is possible to efficiently convert triglycerides not only with methanol but also with ethanol by means of the method according to the invention. Thus, the above described dual function of the compounds of general formula (I) as a catalyst and solubilizer is also observed in the transesterification with ethanol. The reaction with ethanol here proceeds at a rate comparable to the reaction with methanol. In addition, a skilled person could not foresee that by means of a compound of general formula (I) the transesterification of triglycerides can also be catalyzed with polyvalent alcohols. For example, glycerol monoesters and diesters and the corresponding monoalcohol and dialcohol esters of propanediol form e.g. from a mixture of propanediol and triglycerides (i.e. fat and/or oil) when a compound of general formula (I) is added.

Moreover, it has unexpectedly been found that the compounds of general formula (I) according to the invention still have a high catalytic activity even in the presence of a rather high water concentration. This is surprising in so far as water actually shifts the balanced condition of the transesterification reaction towards the side of the educts. Even traces of water result in a drastic loss of yield when commercial basic catalysts (i.e. NaOH, KOH, Na-methylate, K-methylate) are used.

The good water tolerance is of considerable economic significance since in this case the alcohol does not have to be absolutized in an energy- and cost-intensive way, or only has to be absolutized to a minor extent, before it is used in the method according to the invention. The water tolerance is of significance e.g. for the production of "real" biodiesel by is transesterification of fats and/or oils of biogenic origin with biotechnologically produced bioethanol and enables the direct production of ethyl esters from an azeotropic solution of alcohol and water. As a result, the overall efficiency of the ethyl ester production is considerably improved.

The compounds of general formula (I) thus combine in a unique way the basicity required for the catalytic transesterification with the function of a solubilizer for the multiphase system used in the method according to the invention.

Another advantage of the presently described method is that the main by-product accumulating in the transesterification method according to the invention, i.e. glycerol, may be employed in the animal feed industry, in particular when choline or a derivative thereof is used as the catalyst according to general formula (I). Glycerol is known to be usable e.g. in poultry farming as a feed additive up to a concentration of about 5% by weight (Cerrate et al., Int. J. Poultry Sci. 5(11): 1001-1007 (2006)). However, glycerol from conventional transesterifications is not suited as a feed additive due to the salt load since the electrolyte balance of the animals may be disturbed by it. When choline is used in the method according to the invention for the production of fatty acid esters, these problems do not exist. Choline is widely used as a feed additive to feed poultry, remnants and pigs. Choline compound residues in the glycerol are therefore even advantageous for use in the animal feed industry and along with the fatty acid esters represent another valuable product obtainable with the method according to the invention.

In contrast to the commercially employed catalysts (i.e. NaOH, KOH, Na-methylate, K-methylate), the compounds of general formula (I), which are used as catalysts, in particular choline, e.g. in the form of the choline base or in the form of a choline salt, such as choline carbonate, may also be produced so as to be free from alkalis and alkaline earths or other metal cations. Correspondingly, the glycerol accumulating in the method according to the invention and enriched with a catalyst may be combusted without a catalyst-related (metal) salt formation occurring.

A catalyst particularly suited within the scope of the present invention is an above defined compound of general formula (I), wherein R1, R2 and R3 are equal or different and each represents an unsubstituted er substituted straight-chain alkyl residue having 1 to 6 carbon atoms.

Particularly suited catalysts for use in the method according to the invention are also the above defined compounds of general formula (I), wherein R is a straight-chain hydroxyalkyl residue having 1 to 12 carbon atoms, preferably 1 to 8, more preferably 2 to 8 and most preferably 2 to 6 or 2 to 4 carbon atoms. It is preferred for R to have at least one, in particular only one, hydroxyl group which is preferably disposed at position 2. It is particularly preferred for R to be 2-hydroxyethyl. It is most preferred for choline to be used as a catalyst in the method according to the invention.

The compounds of general formula (I), which are used as catalysts, can be produced in chemical and synthetic fashion or be recovered from biological sources. In particular, it is possible to use a choline compound which can be obtained in the production of choline by ethoxylation of trimethylamine in methanol and, along with choline as the main component, also contains over-ethoxylated products of the main component as well as an over-ethoxylated solvent, such as methoxyethylene glycol, as by-products in an amount of up to 10% by weight.

The catalysts of general formula (I), which are used in the method according to the invention, may either be used in free form or in the form of a salt, optionally dissolved in an organic solvent, such as methanol. Suitable salts comprise salts with organic or inorganic anions. Preferred examples are basic salts of the compounds of general formula (I), in particular hydroxide, phosphate and carboxylic acid salts, such as hydrogen carbonate and carbonate salts. Particularly preferred salts for use in the method according to the invention are in particular choline salts, e.g. choline hydroxide, choline phosphate and choline carbonate.

According to a particular other embodiment of the present invention, the organic or inorganic anions are no hydroxide or alcoholate anions.

In addition, the compounds of general formula (I) may also be used based on the present invention in a form in which they are supported on a carrier material or are bound thereto, i.e. in heterogenized or supported form.

The catalyst is preferably used in the method according to the invention in an amount of 0.01 to 20% by weight, in particular in an amount of 0.05 to 4.0% by weight and more preferably to in an amount of 0.1 to 2.0% by weight, based on the total weight of the employed fat and/or oil of biogenic origin (or the employed triglycerides).

Suitable monovalent alcohols for use in the method according to the invention comprise methanol, ethanol, n-propanol, isopropanol and butanol but are not limited thereto. Preferred monovalent alcohols comprise methanol, which is recovered in large amounts from fossil raw materials, and ethanol which is readily accessible from biotechnological processes. Suitable polyvalent alcohols are in particular divalent and, to a minor extent, trivalent alcohols. Preferred divalent alcohols comprise propanediol or butanediol, in particular 1,2-propanediol, but are not limited thereto. Both the monovalent and also the polyvalent alcohols may be used as such or in admixture with one and/or more other monovalent or polyvalent alcohols. It is preferred to use in the method according to the invention a monovalent alcohol selected from methanol and ethanol or a mixture thereof.

As described above, the method according to the invention is distinguished by a surprisingly good water tolerance so that the employed alcohols may have a water content of up to about 10 to 15% by weight and, depending on the employed alcohol, a conversion rate of 50 to 80% can still be achieved. For an efficient transesterification (conversion rate >90%) the water content is, however, preferably less than 2% by weight, in particular less than 1% by weight.

Fats and/or oils which may be used in the method according to the invention comprise all fats and/or oils of biogenic origin as well as any mixtures thereof. The term "biogenic origin" which is used in the present invention means "of biological or organic origin", i.e. not of chemical and synthetic origin. Thus, the term "fats and/or oils of biogenic origin" comprises all fats and/or oils which are formed from plants, animals or microorganisms (in particular fungi, algae and bacteria). Fats and oils of biogenic origin consist of glycerides (mono-, di- and triglycerides), and substantially of triglycerides. In this description, the term "triglycerides" is thus sometimes also used synonymously for fat and/or oil of biogenic origin.

It is preferred to use a fat and/or oil of vegetable origin in the method according to the invention. A "vegetable oil"

within the meaning of the present invention does not only refer to a vegetable oil of a certain plant, such as rapeseed oil, but also to any mixtures of different vegetable oils. Examples of suitable vegetable oils are cotton seed oil, safflower oil, jatropha oil, peanut oil, hazelnut oil, coconut oil, pumpkin seed oil, linseed oil, corn oil, olive oil, palm oil, palm kernel oil, rapeseed oil (also referred to as colza oil), rice oil, soy bean oil, sunflower oil, grape seed oil and wheat germ oil, in refined or cold-pressed form, and any mixtures thereof. Oils recovered from algae may also be used. Vegetable oils preferred in the present invention are rapeseed oil, palm oil, sunflower oil, soy bean oil or mixtures thereof, with rapeseed oil and sunflower oil being particularly preferred.

Starting fats and oils which are particularly suited for use in the method according to the invention have an acid number of less than 1.0, which corresponds approximately to a concentration of free fatty acids of less than 0.5% by weight depending on the particular fat and oil. The fats and/or oils preferably contain an amount of free fatty acids of no more than 0.2% by weight. However, the method according to the invention may also use fats and/or oils having a higher free fatty acid content. In order to obtain a fat and/or oil having a very small free fatty acid content, it may be necessary for the starting fats and/or oils to be subjected to a deacidification treatment before they are used.

As already explained in connection with the usable alcohols, the fat or oil may also contain residual water amounts without this negatively affecting the method according to the invention in a significant manner. However, the residual water amount in the fats and/or oils, which are usually used in the method according to the invention, is usually very small and is typically no more than about 1% by weight.

In the method according to the invention, the alcohol is usually added in excess to obtain a high yield of desired fatty acid esters of monovalent or polyvalent alcohols. Here, the molar ratio of the monovalent and/or polyvalent alcohol to the fat and/or oil of biogenic origin is preferably at least 6:1. In the case of monovalent alcohols, such as methanol or ethanol, this corresponds to a 2-fold stoichiometric excess because at least 3 moles of methanol or ethanol are required to form 3 moles of methyl ester or ethyl ester from 1 mole of triglycerides. In the case of polyvalent alcohols, the preferred molar ratio may also be smaller and in the case of divalent alcohols it may be at least 2:1, for example.

In addition to the above mentioned components, it is possible to add to the reaction mixture, where appropriate, further substances, such as catalyst stabilizers, which are compatible with the reaction conditions and the intended use of the reaction end products.

In standard stirred reactors, the transesterification may be carried out without pressure and under reflux. Alternatively, the reaction control in tubular reactors is conceivable. First, the starting products, i.e. fats and/or oils of biogenic origin, and the catalyst are fed to the reactor and are all converted in the reactor at a suitable temperature into glycerol and the desired fatty acid ester of the employed monovalent and/or polyvalent alcohol. After a contact time (hereinafter also "reaction time") of some few minutes, the formation of glycerol is observed, the transesterification reaction being concluded after a reaction time of at least 15 minutes, typically 30 to 60 minutes.

The reaction is usually carried out with stirring so as to increase the substance transport and thus the reaction efficiency. The temperature of the transesterification reaction is above the melting temperature of the employed fat having the highest melting temperature if fats are used. The reaction temperature of the method according to the invention is usually below 250° C. The reaction temperature is preferably adjusted so as to be approximately within the region of the boiling temperature of the reaction mixture at atmospheric pressure. However, it has been found surprisingly that the transesterification reaction even proceeds significantly at lower temperatures, even at room temperature.

According to a preferred embodiment of the method of the invention, the fat and/or oil of biogenic origin is initially contacted with the monovalent and/or polyvalent alcohol and then the catalyst is added to the resulting mixture. The catalyst is here preferably dissolved in a solvent, wherein the solvent is preferably an alcohol, in particular the monovalent and/or polyvalent alcohol used in the transesterification reaction, such as methanol or ethanol. Alternatively, the catalyst may also be dissolved in the monovalent and/or polyvalent alcohol to be esterified and may then be mixed with the fat and/or oil of biogenic origin in the reactor.

After the conclusion of the conversion of fat and/or oil of biogenic origin with the monovalent and/or polyvalent alcohol in the presence of the catalyst described herein thereby forming glycerol and fatty acid esters, the glycerol may be separated in a further method step. This may be done in the reaction vessel as such or in optionally subsequent treatment steps. Having concluded stirring, the glycerol collects as the lower phase in the reaction vessel and can be withdrawn separately. Alternatively, the glycerol may also be withdrawn in downstream apparatuses and/or methods utilizing the density differences. The phase separation may be made by means of gravity, i.e. by simply allowing it to stand. To this end, a sedimentation container may be used, for example. However, it is also possible to use centrifugal forces, e.g. in hydrocyclones or centrifuges.

The excess alcohol, e.g. excess methanol or ethanol, can be removed separately from each of the resulting glycerol phase and the resulting ester phase. This may be done by known methods, e.g. by distillation. In an alternative embodiment of the method according to the invention, the excess alcohol may also be removed before the separation of the glycerol and ester phases. The recovered alcohol may be recycled to the reaction. Due to the water tolerance of the method according to the invention, a complex subsequent drying step of the alcohol may be omitted or the interval up to the use of fresh alcohol may be considerably prolonged.

The glycerol and/or the glycerol phase contains substantially the entire amount of the hydroxy-functional quaternary ammonium compound used as the catalyst, usually over 99% of the employed catalyst. The catalyst containing glycerol may thus be used in a next reaction step, i.e. in a further transesterification, to catalyze the reaction between alcohols, in particular monovalent alcohols, such as methanol and/or ethanol, and triglycerides. It has been found surprisingly that the glycerol recycled in this way results in a considerable formation of fatty acid esters. Such a recycling of the glycerol produced in the transesterification method markedly improves the economic efficiency of the method according to the invention since in this way more fatty acid esters than formerly can be produced with a certain amount of overall to employed catalyst.

After the separation of the excess alcohol, the catalyst-containing glycerol is also available for further uses. Depending on the type of educts used, the employed catalyst and the intended use, further purification steps known to a skilled person, such as bleaching, filtration, neutralization, etc., may optionally be required. The resulting glycerol may be used materially or energetically. For example, the glycerol may be used with the catalyst enriched therein, as already described above, optionally as a food supplement or feed additive in the animal production industry or animal feed industry. Alternatively, the catalyst-containing glycerol may also be used to recover energy by combustion, gasification or pyrolysis or in fermentation processes and biogas systems.

When the fats and/or oils used as the starting products are carefully selected and pre-cleaned, the alcohol ester phase produced is a clear phase which under certain circumstances may have a slightly yellow color. Depending on the intended use, the ester phase may be used as such. Alternatively, further purification steps may be necessary. Such purification steps may be neutralization, discoloration, removal of trace components, etc. This may be made e.g. by sorption processes with solid or liquid auxiliary materials.

In the case of the fatty acid esters formed with monovalent alcohols, the esters formed may be used as a chemical raw material, e.g. as a starting product for chemical syntheses or as biofuel or biocombustible. For example, the end product of the transesterification with methanol, i.e. fatty acid methyl ester, has a markedly lower viscosity than the employed fat and/or oil and on account of its physical properties may be used as a substitute for diesel fuel.

The glycerol monoesters or glycerol diesters, which are formed in the transesterification with polyvalent alcohols, such as propanediol, may be used as a mixture or after purification or fractionation e.g. as food emulsifiers or as a chemical raw material, e.g. in the detergent synthesis.

The method according to the invention is explained in more detail below by different examples.

EXAMPLES

Example 1

This example illustrates the transesterification of rapeseed oil with methanol into fatty acid methyl esters and glycerol using choline base as a catalyst.

A mixture of 100 g rapeseed oil and 20 methanol (corresponds to a molar ratio of alcohol to oil of about 6:1) was heated to reaction temperature (boiling temperature) under stirring and with reflux. Having reached the boiling temperature, 4.8 g catalyst solution (choline base solution 44% in methanol) was added. Some few seconds after the addition of the catalyst to solution, the initially turbid dispersion from methanol and oil changed into a clear mixture and the precipitation of glycerol was observed after some minutes.

After a reaction time of 60 minutes, the reaction mixture was placed in a rotary evaporator to distill off the excess methanol (final pressure about 50 mbar). The residue from the distillation was then transferred to a separating funnel. The mixture separated into two phases at room temperature.

The lower heavier phase had a mass of 11.76 g and a glycerol concentration of about 85% by weight. The upper lighter phase had a mass of 97.14 g and contained 96.4% by weight of fatty acid methyl ester (rapeseed oil methyl ester), <2% by weight of triglycerides, 0.96% by weight of diglycerides, 1.12% by weight of monoglycerides and 0.04% by weight of glycerol, determined by gas chromatography according to DIN EN 14103 for fatty acid methyl esters and according to DIN EN 14105 for partial glycerides and glycerol.

Example 2

The transesterification according to Example 1 was carried out, but the reaction time was 45 minutes. The resulting upper lighter and lower heavier phases had a mass of 98.17 g and 10.6 g, respectively. The upper lighter phase contained 96.1% by weight of fatty acid methyl ester, <2% by weight of triglycerides, 0.96% by weight of diglycerides, 0.91% by weight of monoglycerides and 0.02% by weight of glycerol.

Example 3

The transesterification method according to Example 1 was carried out, however, the reaction time was 15 minutes. The resulting upper lighter and lower heavier phases had a mass of 96.40 g and 11.06 g, respectively. The upper lighter phase contained 93.7% by weight of fatty acid methyl ester, <2% by weight of triglycerides, 1.96% by weight of diglycerides, 1.30% by weight of monoglycerides and 0.03% by weight of glycerol.

Example 4

The transesterification method according to Example 1 was carried out, however, a mixture of 100 g rapeseed oil and 14 g methanol (molar ratio of alcohol:oil of about 4.5:1) and 5.0 g catalyst solution (choline base solution 44% in methanol) was used, and the reaction time was 30 minutes.

The resulting upper lighter phase had a mass of 99.10 g and the lower heavier phase had a mass of 10.6 g. The upper lighter phase contained 90.6% by weight of fatty acid methyl ester, 2.19% by weight of triglycerides, 2.63% by weight of diglycerides, 1.42% by weight of monoglycerides and 0.02% by weight of glycerol.

Example 5

This example illustrates the transesterification of rapeseed oil with ethanol into fatty acid ethyl esters and glycerol using choline base as the catalyst.

A mixture of 100 g rapeseed oil and 20 g ethanol (corresponds to a molar ratio of alcohol to oil of about 4.2:1) was heated to the reaction temperature (boiling temperature) under stirring and with reflux. Having reached the boiling temperature, 4.8 g catalyst solution (choline base solution 44% in methanol) was added. Some few seconds after the addition of the catalyst solution, the initially turbid dispersion of ethanol and oil converted into a clear mixture and the precipitation of glycerol was observed after some minutes.

After a reaction time of 45 minutes, the reaction mixture was placed in a rotary evaporator to distill off excess ethanol (final pressure about 50 mbar). The residue from the distillation was then transferred to a separating funnel. The mixture separated into two phases at room is temperature.

The lower heavier phase had a mass of 17.0 g and the glycerol concentration was about 43% by weight. The upper lighter phase had a mass of 95.80 g and contained 87.1% by weight of fatty acid ethyl ester (rapeseed oil ethyl ester), <1% by weight of triglycerides, 3.63% by weight of diglycerides, 1.5% by weight of monoglycerides and 0.04% by weight of glycerol, determined by means of gas chromatography according to DIN EN 14103.

Example 6

This example illustrates the transesterification of rapeseed oil with water-containing methanol into fatty acid methyl esters and glycerol using choline base as the catalyst.

The employed method substantially corresponds to the method according to Example 2; however, a total of 2 g water (corresponds to a water content of 8.8% by weight, based on the total alcohol amount, i.e. 20 g methanol plus the amount of alcohol introduced into the system by the catalyst solution)

was added to the mixture of 100 g rapeseed oil, 20 g methanol (molar ratio of alcohol:oil of about 6:1) and 4.8 g catalyst solution (choline base solution 44% in methanol).

The resulting upper lighter phase had a mass of 97.50 g and contained 74.6% by weight of fatty acid methyl ester, >20% by weight of triglycerides, 5.24% by weight of diglycerides, 1.17% by weight of monoglycerides and 0.02% by weight of glycerol.

Example 7

This example illustrates the transesterification of rapeseed oil with water-containing ethanol into fatty acid ethyl esters and glycerol using choline base as the catalyst.

The employed method substantially corresponds to the method according to Example 5; however, a total of 0.9 g water (corresponds to a water content of 4.0% by weight, based on the total alcohol amount, i.e. 20 g ethanol plus the amount of alcohol introduced into the system by the catalyst solution) was added to the mixture of 100 g rapeseed oil, 20 g ethanol (molar ratio of alcohol:oil of about 4.2:1) and 4.8 g catalyst solution (choline base solution 44% in methanol). In the case of ethanol, this water content corresponds to that of azeotropic ethanol.

The resulting upper lighter phase had a mass of 100.2 g and contained 60.6% by weight of fatty acid ethyl ester, 5.50% by weight of triglycerides, 10.94% by weight of diglycerides, 10.65% by weight of monoglycerides and >0.55% by weight of glycerol.

Example 8

This example illustrates the transesterification of rapeseed oil with methanol into fatty acid methyl esters and glycerol using choline carbonate as the catalyst.

The employed method substantially corresponds to the method according to Example 1, a to choline carbonate solution 74% in methanol being used as the catalyst solution. The resulting upper lighter phase had a mass of 98.2 g while the lower heavier phase had a mass of 5.7 g. The upper lighter phase contained 56.3% by weight of fatty acid methyl esters, >20% by weight of triglycerides, 20.96% by weight of diglycerides, 4.32% by weight of monoglycerides and 0.11% by weight of glycerol.

Example 9

This example illustrates the transesterification of rapeseed oil with ethanol into fatty acid ethyl esters and glycerol using choline carbonate as the catalyst.

The employed method substantially corresponds to the method according to Example 5, however, a choline carbonate solution 74% in methanol was used as the catalyst solution. The resulting upper lighter phase had a mass of 100.0 g while the lower heavier phase had a mass of 6.2 g. The upper lighter phase contained 62.3% by weight of fatty acid ethyl ester, 12.95% by weight of triglycerides, 17.47% by weight of diglycerides, 5.22% by weight of monoglycerides and 0.48% by weight of glycerol.

Example 10

This example illustrates the transesterification of rapeseed oil with 1,2-propanediol into fatty acid esters and glycerol using choline base as the catalyst.

A mixture of 50 g rapeseed oil and 10 g 1,2-propanediol (corresponds to a molar ratio of alcohol to oil of about 2.5:1) was heated to the reaction temperature (boiling temperature) under stirring and with reflux. Having reached the boiling temperature, 4.8 g catalyst solution (choline base solution 44% in methanol) was added. Some few seconds after the addition of the catalyst solution, the initially turbid dispersion of 1,2-propanediol and oil converted into a clear mixture.

After a reaction time of 30 minutes, the excess 1,2-propanediol was separated with a rotary evaporator (final pressure 50 mbar). The residue (homogeneous phase) had the following composition: 11% by weight of monoglycerides, 21.7% by weight of diglycerides, 1.2% by weight of triglycerides, 4% by weight of glycerol. In addition, small amounts of methyl ester formed from the methanol portion which was introduced by the methanolic solution of the catalyst.

Example 11

This example illustrates the transesterification of rapeseed oil with methanol into fatty acid methyl esters and glycerol employing a reusable choline base-containing glycerol phase.

The transesterification method according to Example 1 was initially carried out, however, 200 g rapeseed oil, 24 g methanol and 20 g catalyst solution (choline base solution 20% in methanol) were employed. The resulting heavier phase (25 g choline base-containing glycerol phase) was separated and used without further treatment as the catalyst for another transesterification. To this end, a mixture of 200 g rapeseed oil, 40 g methanol and 25 g of the choline base-containing glycerol phase from the first transesterification was heated to the reaction temperature (boiling temperature) under stirring and with reflux. The test was terminated after 60 minutes and the product phases were recycled as described in Example 1.

The resulting upper lighter and lower heavier phases had a mass of 203.0 g and 30.44 g, respectively. The upper lighter phase contained 67.58% by weight of fatty acid methyl ester, 17.58% by weight of triglycerides, 8.13% by weight of diglycerides, 2.28% by weight of monoglycerides and 0.06% by weight of glycerol.

The invention claimed is:

1. A method for producing fatty acid esters of monovalent or polyvalent alcohols by means of a catalyst, comprising reacting fat and/or oil of biogenic origin with monovalent and/or polyvalent alcohols in the presence of a catalyst, wherein the catalyst is a hydroxy-functional quaternary ammonium compound of the following formula (I):

in which R1, R2 and R3 are equal or different and each represents an unsubstituted straight-chain alkyl residue having 1 to 6 carbon atoms, and R is a straight-chain or branched hydroxyalkyl, hydroxyalkenyl or hydroxyalkynyl residue having 1 to 8 carbon atoms.

2. The method according to claim 1, wherein R is a straight-chain hydroxyalkyl residue having 1 to 12 carbon atoms.

3. The method according to claim 1, wherein R is 2-hydroxyethyl.

4. The method according to claim 1, wherein choline or a salt thereof is used as the catalyst.

5. The method according to claim 1, wherein the catalyst is used in an amount between 0.01 and 4.0% by weight, based on the weight of the employed fat and/or oil of biogenic origin.

6. The method according to claim 1, wherein the monovalent alcohol is selected from the group consisting of methanol, ethanol, n-propanol, isopropanol, butanol and mixtures thereof and the polyvalent alcohol is a divalent alcohol selected from the group consisting of propanediol, butanediol and mixtures thereof.

7. The method according to claim 1, wherein the employed fat and/or oil of biogenic origin contains less than 0.5% by weight of fatty acids.

8. The method according to claim 1, wherein the molar ratio of the monovalent and/or polyvalent alcohol to the fat and/or oil of biogenic origin is at least 6:1.

9. The method according to claim 1, further comprising the purification of the formed fatty acid ester of monovalent or polyvalent alcohols by separation of the by-products formed.

10. The method according to claim 9, wherein the by-product formed is a glycerol product, comprising a catalyst-containing glycerol fraction.

11. The method according to claim 1, wherein the hydroxy-functional quaternary ammonium compound used as the catalyst is employed in the form of a glycerol fraction which is obtainable according to a method as defined in claim 1 and in which the hydroxy-functional quaternary ammonium compound used as the catalyst is enriched.

12. A method of preparing a feed additive for use in the animal feed industry, the feed additive including fatty acid esters of monovalent or polyvalent alcohols produced by means of a catalyst, the method comprising:
reacting fat and/or oil of biogenic origin with monovalent and/or polyvalent alcohols in the presence of a catalyst, wherein the catalyst is a hydroxy-functional quaternary ammonium compound of the following formula (I):

(I)

in which R1, R2 and R3 are equal or different and each represents an unsubstituted straight-chain alkyl residue having 1 to 6 carbon atoms, and
R is a straight-chain or branched hydroxyalkyl, hydroxyalkenyl or hydroxyalkynyl residue having 1 to 8 carbon atoms;
purifying of the formed fatty acid esters of monovalent or polyvalent alcohols by separating the catalyst containing the glycerol faction as a by-product, wherein the catalyst is used in an amount of 0.01 to 2.0 percent by weight, based on the weight of the employed fat and/or oil of biogenic origin.

* * * * *